United States Patent
Moore et al.

(10) Patent No.: US 12,358,038 B2
(45) Date of Patent: Jul. 15, 2025

(54) METALLIC TUBULAR PRODUCTS WITH ENHANCED COLLAPSE RESISTANCE

(71) Applicant: United States Steel Corporation, Pittsburgh, PA (US)

(72) Inventors: Peter W. Moore, Houston, TX (US); Bisen Lin, Katy, TX (US)

(73) Assignee: United States Steel Corporation, Pittsburgh, PA (US)

( * ) Notice: Subject to any disclaimer, the term of this patent is extended or adjusted under 35 U.S.C. 154(b) by 395 days.

(21) Appl. No.: 17/508,420

(22) Filed: Oct. 22, 2021

(65) Prior Publication Data

US 2022/0040749 A1     Feb. 10, 2022

Related U.S. Application Data

(62) Division of application No. 15/896,759, filed on Feb. 14, 2018, now Pat. No. 11,179,763.
(Continued)

(51) Int. Cl.
    *C21D 9/08*           (2006.01)
    *B21B 17/14*        (2006.01)
    (Continued)

(52) U.S. Cl.
    CPC ............ *B21D 35/005* (2013.01); *B21B 17/14* (2013.01); *B21B 19/06* (2013.01); *B21B 45/004* (2013.01);
    (Continued)

(58) Field of Classification Search
    CPC .......... B21D 35/005; B21D 3/02; B21D 3/10; B21D 22/28; B21B 17/14; B21B 19/06;
    (Continued)

(56) References Cited

U.S. PATENT DOCUMENTS

| | | |
|---|---|---|
| 2,178,141 A | 7/1939 | Frame |
| 3,054,438 A | 9/1962 | Udo et al. |

(Continued)

FOREIGN PATENT DOCUMENTS

| | | |
|---|---|---|
| JP | S60221130 | 11/1985 |
| JP | H09316539 | 12/1997 |

OTHER PUBLICATIONS

The International Search Report and the Written Opinion of the International Searching Authority for International Application No. PCT/US2018/018212, 19 pages.

*Primary Examiner* — David R Deal
(74) *Attorney, Agent, or Firm* — Alan G. Towner; Leech Tishman Fuscaldo & Lampl (57) ABSTRACT

Metallic tubular products having improved collapse resistance are disclosed. The metallic tubular products are produced by compressive forming processes. The method comprises identifying the types of stress that can be applied in order to change the residual stress profile of metallic tubular products, such as those that have completed a straightening process, and results in a residual stress profile that improves collapse resistance. The metallic tubular products are subjected to radial compression processing to control the residual stress profile and to enhance collapse resistance. The radial compression process may be used after the tubular product has been subjected to a straightening process.

14 Claims, 10 Drawing Sheets

Related U.S. Application Data (60) Provisional application No. 62/458,838, filed on Feb. 14, 2017.

(51) Int. Cl.
  *B21B 19/06* (2006.01)
  *B21B 45/00* (2006.01)
  *B21D 3/02* (2006.01)
  *B21D 3/10* (2006.01)
  *B21D 22/28* (2006.01)
  *B21D 35/00* (2006.01)
  *B21H 1/20* (2006.01)
  *C21D 7/10* (2006.01)
  *F16L 9/02* (2006.01)

(52) U.S. Cl.
  CPC ............... *B21D 3/02* (2013.01); *B21D 3/10* (2013.01); *B21D 22/28* (2013.01); *B21H 1/20* (2013.01); *C21D 7/10* (2013.01); *C21D 9/08* (2013.01); *F16L 9/02* (2013.01)

(58) Field of Classification Search
  CPC ......... B21B 45/004; B21H 1/20; C21D 7/10; C21D 9/08; F16L 9/02
  USPC ......................................................... 138/172
  See application file for complete search history.

(56) References Cited

U.S. PATENT DOCUMENTS

| | | |
|---|---|---|
| 3,222,906 A | 12/1965 | Aurin, III |
| 3,841,137 A | 10/1974 | Mehdizadeh |
| 4,354,882 A | 10/1982 | Greer |
| 4,394,189 A | 7/1983 | Greer |
| 4,825,674 A | 5/1989 | Tanaka et al. |
| 5,951,794 A | 9/1999 | Dickson, Jr. |
| 6,817,633 B2 | 11/2004 | Brill et al. |
| 7,169,239 B2 | 1/2007 | Reavis et al. |
| 7,575,060 B2 | 8/2009 | Hillis et al. |
| 7,895,875 B2 | 3/2011 | Dickson et al. |
| 2004/0055756 A1 | 3/2004 | Hillis et al. |
| 2004/0194278 A1 | 10/2004 | Brill et al. |
| 2008/0053183 A1* | 3/2008 | Dickson ................. B21C 37/30 72/370.13 |
| 2018/0229289 A1 | 8/2018 | Moore et al. |

* cited by examiner

METALLIC TUBULAR PRODUCTS WITH ENHANCED COLLAPSE RESISTANCE

CROSS-REFERENCE TO RELATED APPLICATION

This application is a divisional of U.S. patent application Ser. No. 15/896,759, filed on Feb. 14, 2018, now U.S. Pat. No. 11,179,763 issued Nov. 23, 2021, which claims the benefit of U.S. Provisional Patent Application Ser. No. 62/458,838, filed on Feb. 14, 2017, both of which are incorporated herein by reference.

FIELD OF THE INVENTION

This invention relates to metallic tubular products, and more particularly metallic tubular products having improved collapse resistance resulting from compressive forming processes.

BACKGROUND INFORMATION

In the manufacture of metallic tubular products straightness requirements are stipulated in API, ISO, ASTM, and other standards. To comply with these standards and maintain high volume manufacture, tubes are commonly straightened at room temperature (called cold straightening) using conventional rotary or gag straightening processes. Such processes modify the dimensional properties of tubes by bending sections in the longitudinal and/or the transverse hoop direction which results in yielding (stress levels beyond the elastic limit) some or all of the wall fibers in those sections. As the tube exits the straightening process there is an elastic rebound of the pipe to the new straightened dimensions, which typically results in a residual hoop stress profile that reduces the collapse resistance of the tube. A study reported at an American Petroleum Institute Standards Conference ("Casing Collapse Performance" by P. Mehdizadeh 1974) indicated that tubes without harmful residual stress would have minimum collapse strength properties 20-30% higher than the present API minimum collapse strength. This report indicates that the majority of the harmful residual stress is generated as a direct result of the rotary straightening process.

In conventional tubular manufacturing, the process of cold rotary straightening was performed as the first operation in the tube manufacturing finishing facility. Tube shipped as finished products were affected negatively by the high compressive residual hoop stress in the area of the inner wall fibers and exhibited standard minimum collapse resistance that is based on these processes.

In order to improve the residual stress profile in a manner so as to increase collapse resistance requires that an additional process be employed after straightening that has the effect of changing the existing residual stress to a profile that will improve/increase the collapse resistance of the pipe while at the same time retaining the required straightness.

Attempts have been made to relieve residual stress in rotary straightened metallic tubular products. For example, by reheating the metallic tubular products after rotary straightening. However, a need still exists to enhance the collapse resistance of metallic tubular products by a more effective and economic process.

SUMMARY OF THE INVENTION

The present invention provides a method to enhance the collapse resistance of metallic tubular products. The method comprises identifying the types of stress that can be applied in order to change the residual stress profile of metallic tubular products, such as those which have completed a straightening process, and results in a residual stress profile that improves collapse resistance. The metallic tubular product is subjected to radial compression processing to control the residual stress profile and to enhance collapse resistance. The radial compression process may be used after the tubular product has been subjected to a final straightening process.

An aspect of the present invention is to provide a method of enhancing collapse resistance of a metallic hollow tubular product, the method comprising straightening a metallic hollow tubular product to produce a straightened metallic hollow tubular product having an outer diameter OD and an inner diameter ID, radially compressing the straightened metallic hollow tubular product to produce a radially compressed metallic hollow tubular product having an outer diameter OD' and an inner diameter ID', wherein the straightened metallic hollow tubular product has a compressive residual hoop stress adjacent to an inner surface thereof, and a tensile residual hoop stress adjacent to an outer surface thereof, and wherein the radially compressed metallic hollow tubular product has (a) a substantially reduced compressive residual hoop stress adjacent to an inner surface thereof, or (b) a tensile residual hoop stress adjacent to the inner surface thereof, and the radially compressed metallic hollow tubular product has (a) a substantially reduced tensile residual hoop stress adjacent to an outer surface thereof, or (b) a compressive residual hoop stress adjacent to the outer surface thereof.

Another aspect of the present invention is to provide method of enhancing collapse resistance of a metallic hollow tubular product, the method comprising radially compressing the metallic hollow tubular product to produce a radially compressed metallic hollow tubular product having an outer diameter OD' and an inner diameter ID', wherein at an axial location along the metallic hollow tubular product a radial compressive force acting on one side of a circumference of the metallic hollow tubular products is opposed by at least one radial compressive force acting on an opposite side of the circumference of the metallic hollow tubular product, and wherein the radial compressive force is applied circumferentially around contact areas totaling at least 180 degrees of the metallic hollow tubular product at the axial location.

A further aspect of the present invention is to provide a straightened and radially compressed metallic hollow tubular product comprising an inner surface and an outer surface, wherein the straightened and radially compressed metallic hollow tubular product has (a) a substantially reduced compressive residual hoop stress adjacent to an inner surface thereof, or (b) a tensile residual hoop stress adjacent to the inner surface thereof, and wherein the straightened and radially compressed metallic hollow tubular product has a collapse resistance greater than a collapse resistance of a straightened metallic hollow tubular product that has not been subjected to a radial compression process.

These and other aspects of the present invention will be more apparent from the following description.

DETAILED DESCRIPTION

Metallic tubular products produced in accordance with controlled radial compression processes of the present invention exhibit desirable residual hoop stress profiles and enhanced collapse resistance.

For non-heat treated metallic tubular products, seamless or electric welded raw tubular shells may be subjected to finishing operations including cold rotary or gag straightening, surface inspection, cut-off, threading, coupling, hydro-testing, weighing, measuring, stenciling, coating, final inspection, loading out, and shipping. In accordance with embodiments of the present invention, the radial compressive process can be performed at any stage after the final cold straightening operation. For example, before surface inspection, or before cut-off, or before threading. In certain embodiments, for non-heat treated metallic tubular products, the cold sizing mill may be placed after the cold straightening process to allow the radial compressive process to be performed immediately after cold straightening.

For heat treated metallic tubular products, seamless or electric welded raw tubular shells may be subjected to heat treatment operations including heat treating, hot or cold sizing, and hot or cold rotary straightening, followed by finishing operations including surface inspection, cut-off, threading, coupling, hydro-testing, weighing, measuring, stenciling, coating, final inspection, loading out, and shipping. In accordance with an embodiment of the present invention, the radial compressive process can be performed at any stage after the final straightening process. For example, the radial compressive process may be performed during the finishing operations, e.g., before cut-off, or any time before threading. In certain embodiments, for heat treated metallic tubular products, the hot or cold sizing mill may be placed after the hot or cold rotary straightener to allow the radial compressive process to be performed immediately after hot or cold rotary straightening.

Radially compressed metallic hollow tubular products produced in accordance with the present invention have been found to possess favorable residual hoop stress profiles and enhanced collapse resistance. In certain embodiments, the metallic tubular products have a collapse pressure that may typically be improved by at least 2 percent, for example, greater than 5 percent, greater than 10 percent, greater than 12 percent, or greater than 15 percent, or greater than 20 percent.

Figure 1:
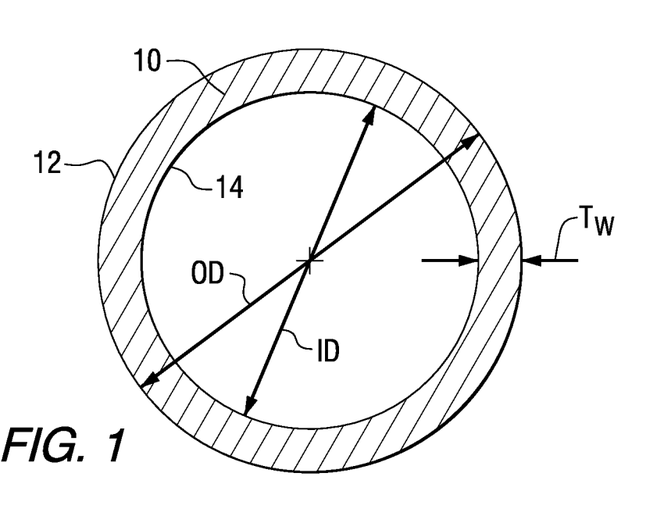
FIG. 1 is a partially schematic cross-sectional view of a rotary straightened metallic hollow tubular product prior to application of a compressive forming process in accordance with an embodiment of the present invention.

FIG. 1 illustrates a straightened metallic hollow tubular product 10 in accordance with an embodiment of the present invention. As used herein, the term "straightened" means a metallic hollow tubular product that has been straightened by means such as rotary straightening, gag straightening, or any other straightening method known to those skilled in the art. The straightened tube 10 includes an outer surface 12, an inner surface 14, and a wall thickness $T_W$. As shown in FIG. 1, the hollow straightened tube 10 may have a circular cross-section having an outer diameter OD and an inner diameter ID.

Figure 2:
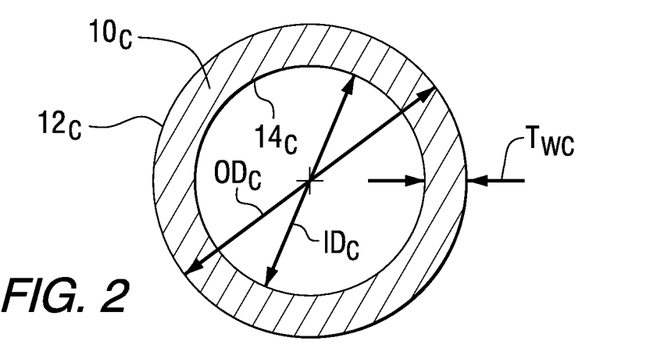
FIG. 2 is a partially schematic cross-sectional view of a metallic hollow tubular product in a radial compression zone in accordance with an embodiment of the present invention.

FIG. 2 illustrates a straightened metallic hollow tubular product in the radial compression zone $10_C$ in accordance with an embodiment of the present invention. The compression zone tube $10_C$ includes an outer surface $12_C$, an inner surface $14_C$, and a wall thickness $T_{WC}$. As shown in FIG. 2, the hollow compression zone tube $10_C$ may have a circular cross-section having an outer diameter $OD_C$ and an inner diameter $ID_C$.

Figure 3:
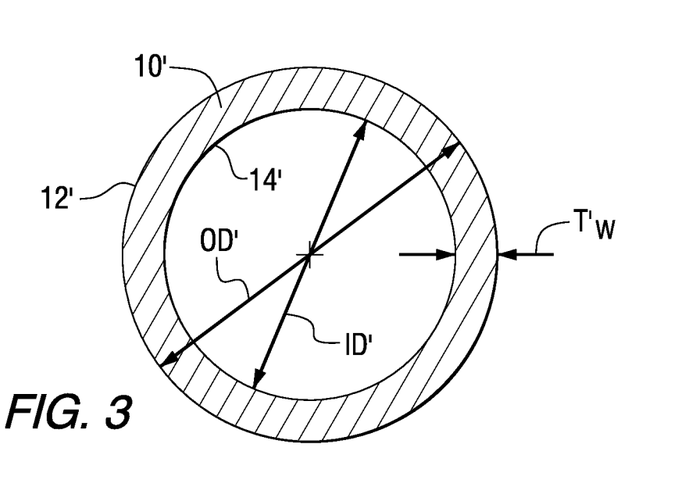
FIG. 3 is a partially schematic cross-sectional view of a radially compressed metallic hollow tubular product after exiting the radial compression zone in accordance with an embodiment of the present invention.

FIG. 3 illustrates a radially compressed metallic hollow tubular product 10' in accordance with an embodiment of the present invention. The radially compressed tube 10' includes an outer surface 12', an inner surface 14', and a wall thickness $T'_W$. As shown in FIG. 3, the hollow radially compressed tube 10' may have a circular cross-section having an outer diameter OD' and an inner diameter ID'.

In accordance with embodiments of the present invention, the outer diameter and wall thickness of metallic tubular products may be varied depending on the intended use of the tube. For example, the outer diameter of tubes may typically range from 2 to 50 inches, for example, from 3 to 40 inches, or from 4.5 to 24 inches. For example, the wall thickness of tubes may typically range from 0.1 to 5 inches, for example, from 0.15 to 3 inches, or from 0.25 to 2 inches.

As understood by those skilled in the art, the percentage change of the outer diameter OD and inner diameter ID of the straightened metallic hollow tubular product 10 to the outer diameter OD' and inner diameter ID' of the radially compressed metallic hollow tubular product 10' after radial compression will vary depending on overall dimensions, wall thickness, D/t ratio, material grade, processing temperature and the like. As used herein, the term "D/t ratio" corresponds to the ratio between the outer diameter of a metallic hollow tubular product to the wall thickness of the metallic hollow tubular product. In accordance with an embodiment of the present invention, the D/t ratio may be from 10:1 to 40:1, for example, from 15:1 to 35:1, or from 20:1 to 30:1.

In certain embodiments, the outer diameter OD' of the radially compressed tube 10' is at least 0.002 percent smaller than the outer diameter OD of the straightened tube 10. For example, the outer diameter OD' of the radially compressed tube 10' may typically be from 0.002 to 0.2 percent smaller than the outer diameter OD of the straightened tube 10.

In certain embodiments, the inner diameter ID' of the radially compressed tube 10' is at least 0.002 percent smaller than the inner diameter ID of the straightened tube 10. For example, the inner diameter ID' of the radially compressed tube 10' may typically be from 0.002 to 0.3 percent smaller than the inner diameter ID of the straightened tube 10.

In certain embodiments, upon radial compression the resultant wall thickness $T'_W$ of the radially compressed tube 10' may thicken slightly from the wall thickness $T_W$ of the straightened tube 10. For example, the wall thickness $T'_W$ of the radially compressed tube 10' may typically range from 0 to 0.5 percent greater, for example, from 0.0005 to 0.3 percent greater than the wall thickness $T_W$ of the straightened tube 10.

During radial compression forming processes in accordance with embodiments of the present invention, the straightened tube may be radially compressed to a minimum diameter, after which the tube 10 springs back to the final radially compressed state with outer and inner diameters OD' and ID'. At the point of maximum radial compression, the outer diameter $OD_C$ of the tube in the radial compression zone may be decreased at least 0.05 percent from the outer diameter OD of the straightened tube 10. For example, the outer diameter $OD_C$ of the tube in the radial compression zone may typically be from 0.05 to 0.6 percent smaller than the outer diameter OD of the straightened tube 10. In certain embodiments, the inner diameter $ID_C$ of the tube in the radial compression zone may be decreased at least 0.05 percent from the inner diameter ID of the straightened tube 10. For example, the inner diameter $ID_C$ of the tube in the radial compression zone may typically be from 0.05 to 0.8 percent smaller than the inner diameter ID of the straightened tube 10.

Figure 4:
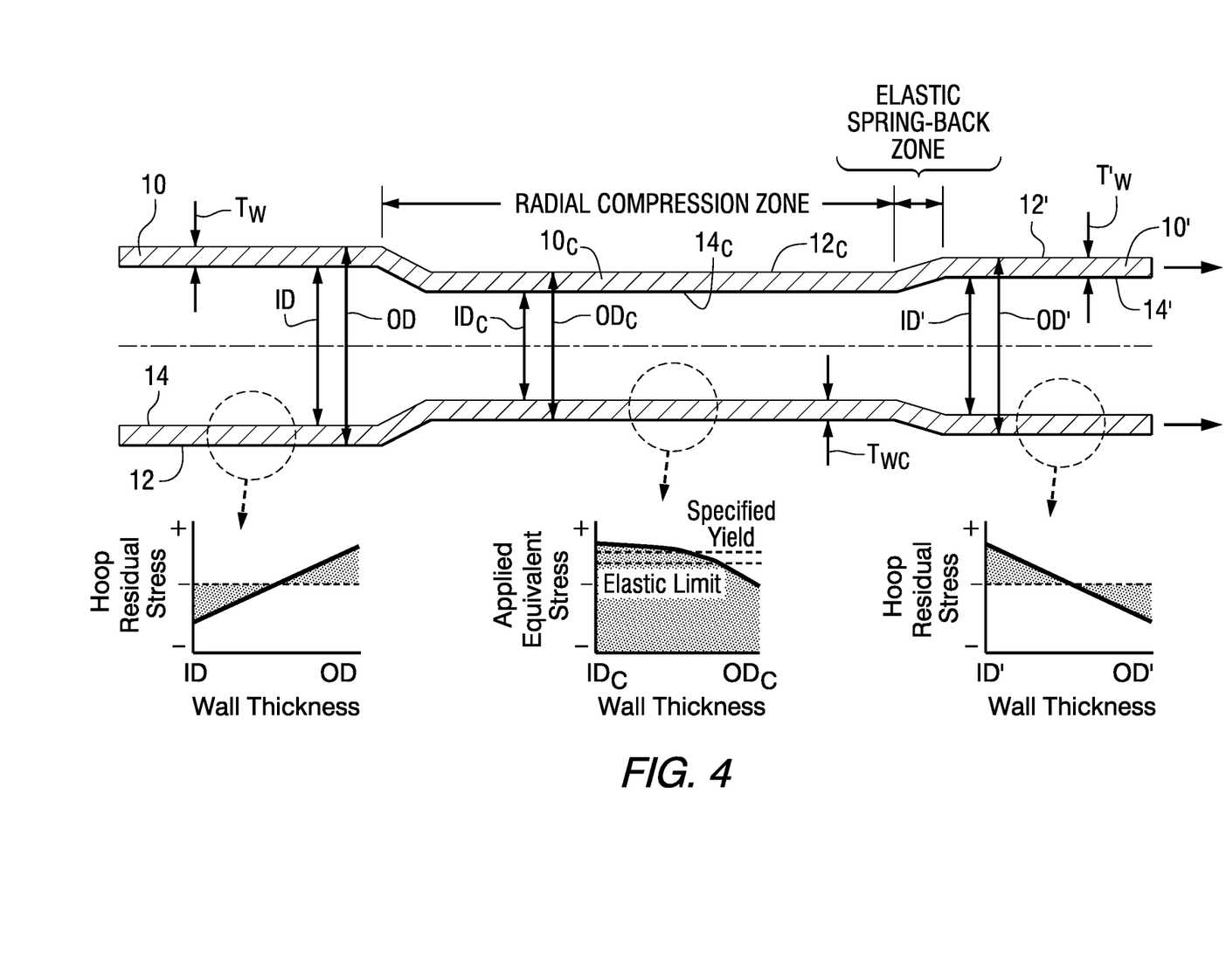
FIG. 4 shows the typical wall thickness stress states before, during and after compressive forming processes in accordance with an embodiment of the present invention.

FIG. 4 illustrates the typical wall thickness stress states before, during and after the metallic tubular product undergoes a radially compressive forming process in accordance with an embodiment of the present invention. In certain embodiments, before the radial compression processing, the straightened tube 10 has a compressive residual stress adjacent to the inner surface 14 and a tensile residual stress adjacent to the outer surface 12. As shown in FIG. 4, a compressive residual stress corresponds to a negative hoop residual stress adjacent to the inner surface 14 of the straightened tube 10, and a tensile residual stress corresponds to a positive residual stress adjacent to the outer surface 12 of the straightened tube 10.

During radial compression processing in accordance with embodiments of the present invention, a compressive force is applied to the previously straightened tube 10 in the radial compression zone to cause a portion of the wall thickness $T_W$ of the tube to yield, i.e., experiences stress levels beyond the elastic limit. In certain embodiments, as a result of the effect that the radial compression processing may have on the yield strength of the radially compressed tube 10', the yield strength of the straightened tube 10 is controlled such that the final yield strength of the radially compressed tube 10', after the radial compression process, is within the specified tolerance range. In certain embodiments, the final yield strength change caused by the radial compression process may be minimal. In certain embodiments, the predominant contributor to enhanced collapse resistance of the radially compressed tube 10' is a beneficial change in the residual stress profile. In certain embodiments, radially compressive force may be applied in the radial compression zone to yield the fibers of the tube that are adjacent to the inner surface 14 of the tube. Compressive hoop of the inner fibers results in a substantially reduced compressive residual hoop stress and, in some cases, a tensile residual hoop stress in those fibers after the tube exits the radial compression zone.

In certain embodiments, after the radial compression processing, the radially compressed tube 10' has a substantially reduced compressive residual hoop stress adjacent to the inner surface 14' which in some cases may exhibit itself as a positive tensile stress. It also substantially reduces the tensile residual hoop stress adjacent to the outer surface 12' which in some cases may exhibit itself as a negative compressive stress. As shown in FIG. 4, a compressive residual hoop stress corresponds to a negative hoop residual stress adjacent to the outer surface 12' of the radially compressed tube 10', and a tensile residual hoop stress corresponds to a positive residual stress adjacent to the inner surface 14' of the radially compressed tube 10'.

Figure 5:
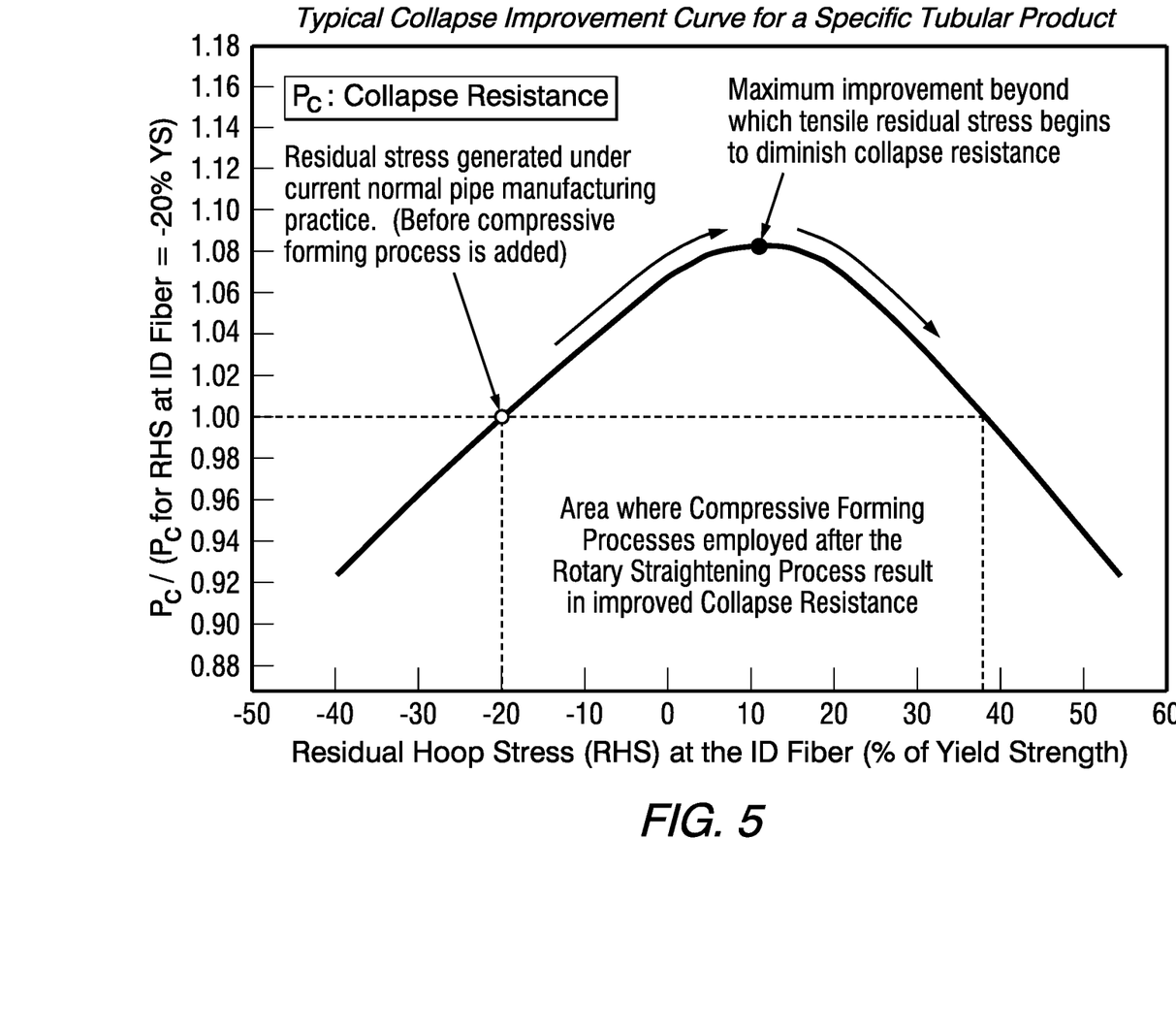
FIG. 5 shows an example of the collapse improvement curve for a metallic tubular product with a specific D/t ratio and a specific material grade in accordance with an embodiment of the present invention.

As an example, FIGS. 4 and 5 illustrate the relationship between collapse resistance improvement and residual hoop stress at the ID fiber (as a percent of yield strength) for a metallic tubular product with a specific D/t ratio and a specific material grade in accordance with an embodiment of the present invention. The collapse resistance is normalized by the collapse resistance of a typical hot rotary straightened tubular product (i.e. compressive residual hoop stress at ID fiber equal to −20 percent of yield strength). In certain embodiments, the compressive residual hoop stress at ID fiber for a cold rotary straightened pipe can be as high as −50 percent of yield strength. Straightening of metallic tubular products often induces a negative residual hoop stress in relation to the yield strength of the tube, i.e., a compressive residual hoop stress, at the inner surface 14 of the straightened tube 10. Radial compression processing in accordance with embodiments of the present invention employed after the straightening process results in improved collapse resistance by providing beneficial residual hoop stress in relation to yield strength, e.g., a substantially reduced compressive residual hoop stress, in wall fibers adjacent to the interior surface of tube. In certain embodiments, the wall fibers adjacent to the interior surface may exhibit a tensile or positive residual hoop stress. In certain embodiments, to achieve the maximum improvement in collapse resistance for a radially compressed tube 10' the residual hoop stress at the inner surface 14' may typically range from −15 to +35 percent of yield strength, or from −10 to +25 percent, or from −7 to +20 percent, or from 0 to +15 percent. In certain embodiments, a radially compressed tube 10' may have a collapse resistance that is at least 2 percent greater than the collapse resistance of a straightened tube 10. For example, the collapse resistance of a radially compressed tube 10' may typically range from 3 to 20 percent greater, or from 5 to 15 percent greater, or from 7.5 to 10 percent greater than the collapse resistance of a straightened tube 10. In accordance with an embodiment of the present invention, a residual hoop stress at the inner surface 14' of the radially compressed tube 10' has limits which, if exceeded, results in an over-tensioned product and the collapse resistance of the radially compressed tube 10' will be reduced. In the example shown in FIG. 5, a residual hoop stress greater than 40 percent of the yield strength diminishes the collapse resistance.

In accordance with an embodiment of the present invention, the metallic tubular product may be subjected to the radial compressive process at any temperature from ambient temperature to 1,250° F. For example, a steel metallic tubular product may be heated to an elevated temperature of at least 500° F., or at least 800° F., or for example, from 1,000° F. to 1,200° F. and enter the radial compressive process at these temperatures. At these temperatures the straightened metallic hollow tubular product 10 generally has a reduced yield strength and as a result a smaller radial compressive force may be used during the radial compression process. Alternatively, the radial compression process may be carried out at ambient or room temperature, e.g., 70°.

Figure 6:
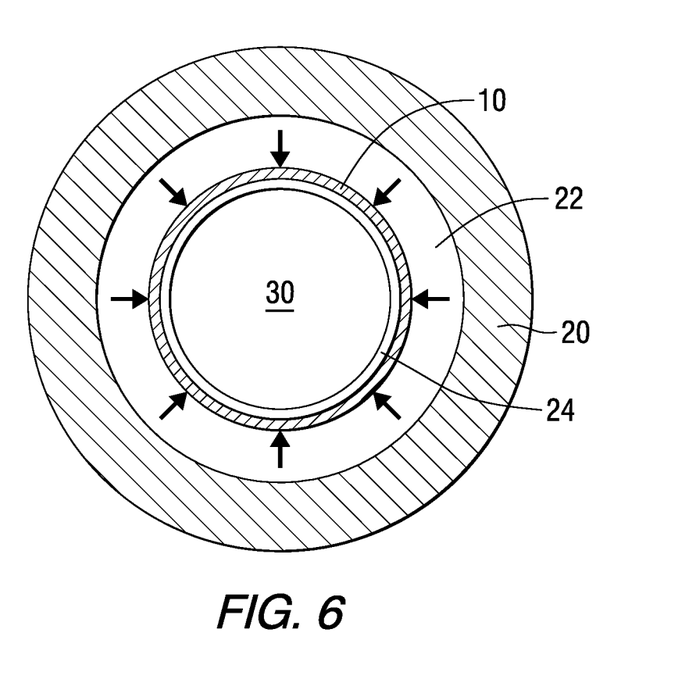
FIG. 6 is a partially schematic view of a metallic tubular product in a hydraulic or gas compression forming chamber in accordance with an embodiment of the present invention.
Figure 7:
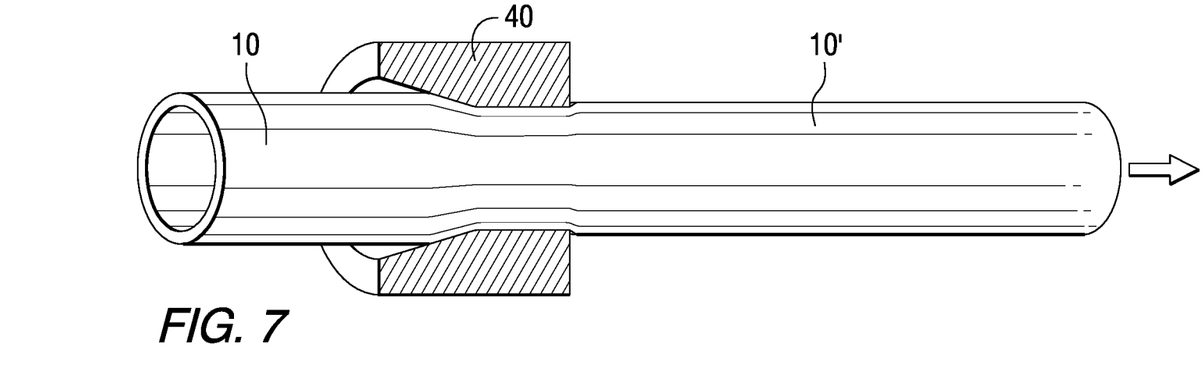
FIG. 7 is a partially schematic view of a metallic tubular product in a drawing die in accordance with an embodiment of the present invention.
Figure 8:
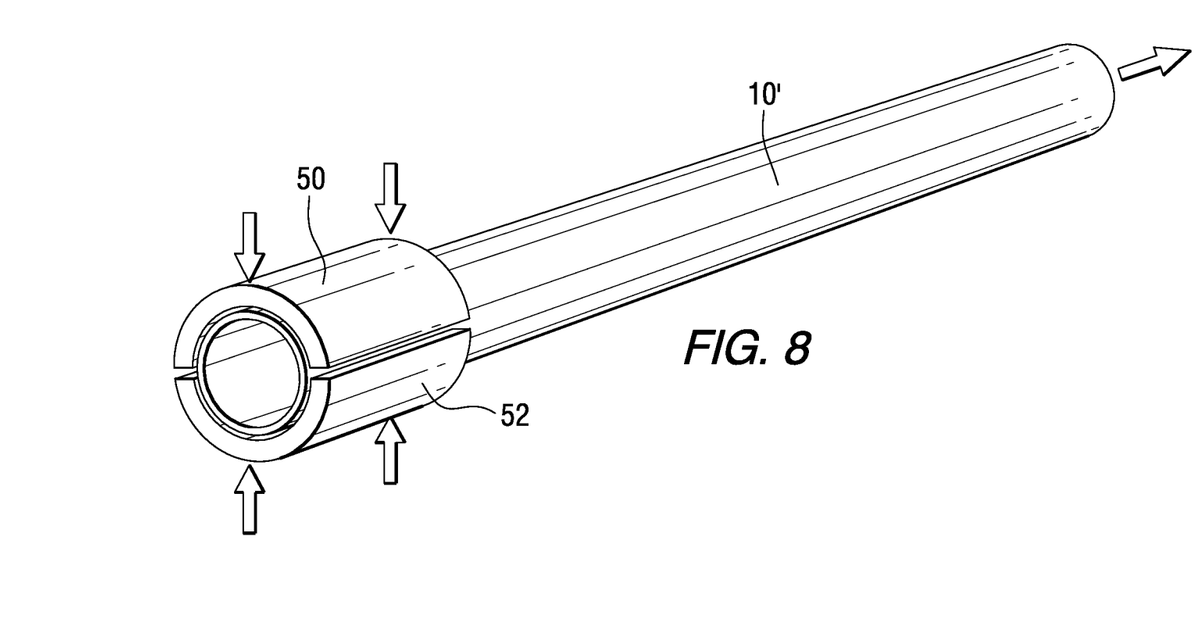
FIG. 8 is a partially schematic view of a metallic tubular product in a length forming die in accordance with an embodiment of the present invention.
Figures 9, 10, 11:
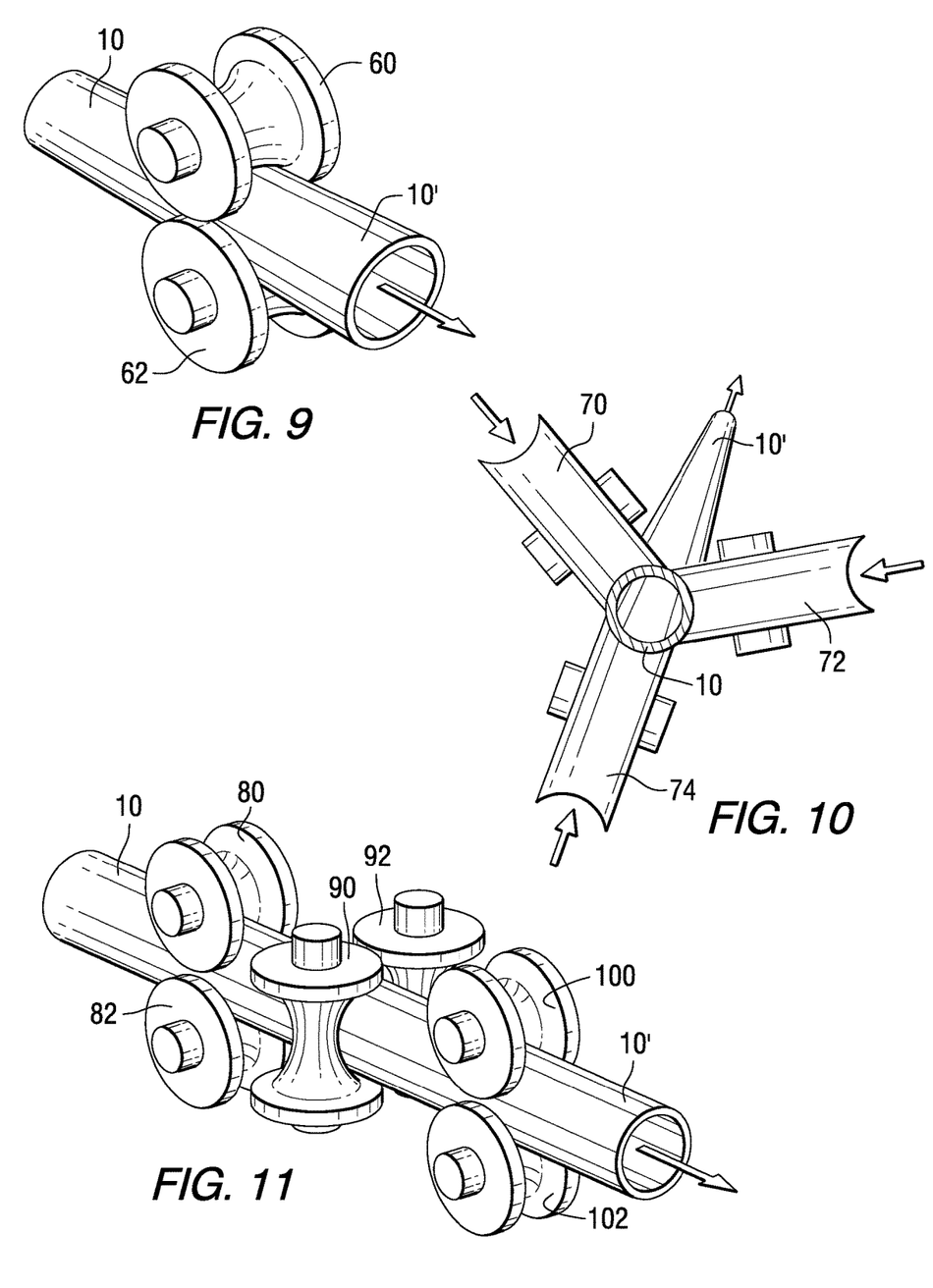
FIG. 9 is partially schematic view of a metallic tubular product in a forming mill comprising two opposing rollers in accordance with an embodiment of the present invention.
FIG. 10 is a partially schematic view of a metallic tubular product in a forming mill comprising three rollers in accordance with an embodiment of the present invention.
FIG. 11 is a partially schematic view of a metallic tubular product in a forming mill comprising three sets of opposing rollers in accordance with an embodiment of the present invention.

In certain embodiments of the present invention, the radially compressive forming process is used to produce metallic tubular products with favorable mechanical properties, such as those described above. Within the radially compressive forming process, multiple methodologies for undertaking the radially compressive process may be used. Examples of compressive forming processes are schematically shown in FIGS. 6-11 and described below. FIG. 6 represents a hydraulic or gas compression of the straightened metallic tubular product 10. FIGS. 7 and 8 represent using compression dies to radially compress the straightened metallic tubular product 10. FIGS. 9-11 represent using compression rollers to radially compress the straightened metallic tubular product 10. In accordance with an embodiment of the present invention, the straightened tube 10 is not rotated during the radially compressive forming process.

In certain embodiments, during the radial compression process, opposing radial compressive forces are applied at a given axial location along the length of the tube to provide substantially equal radial compression throughout the entire circumference and thickness of the tube. Thus, at a particular axial location along the tube, a radial compressive force acting on one side of the tube is opposed by at least one radial compressive force acting on a remaining circumference of the tube. For example, a radial compressive force acting on one side of a circumference of the metallic hollow tubular product is opposed by at least one radial compressive force acting on an opposite side of the circumference of the metallic hollow tubular product. In accordance with an embodiment of the present invention, the radial compressive force applied in the radial compression zone is provided at a large circumferential line contact or surface area of the straightened metallic hollow tubular product 10. In certain embodiments, at any axial location of the tube at which a radially compressive force is mechanically applied, the force is applied circumferentially in two or more segments comprising at least 120 degrees each of the outer surface of the tube. For example, the radially compressive force is circumferentially applied to at least 120 degrees in FIG. 10, or 180 degrees in FIGS. 8, 9 and 11, around the outer surface of the tube at a given axial location of the tube. In accordance with an embodiment of the present invention, the plurality of segments allows the radially compressive force to be circumferentially applied to contact areas totaling at least 180 degrees, or at least 270 degrees, or 360 degrees, around the outer surface of the tube at a given axial location of the tube.

As shown in FIG. 6, the straightened metallic hollow tubular product 10 may be positioned in an enclosure 20 having a chamber 22 to perform a compressive forming process by subjecting 360 degrees around the outer surface of the tube to a hydraulic or gas load. In certain embodiments, the compressive load is applied to the metallic tubular product until a portion or all of the wall thickness $T_W$ of tube has yielded, e.g., experiences a stress level beyond the elastic limit, in the transverse compressive mode. In accordance with certain embodiments, the compressive load is circumferentially applied 360 degrees around the outer surface of the tube, as shown in FIG. 6. This allows the entire circumference and thickness of the tube to experience opposing compressive forces. Once the compressive load is removed and the tube is no longer in the radial compression zone, the tube elastically expands to the radially compressed tube 10'. The radial compression and subsequent expansion allows a substantially reduced compressive residual hoop stress and, in some cases, a tensile residual hoop stress to be formed in wall fibers adjacent to the inner surface.

In accordance with an embodiment of the present invention, the straightened metallic tubular product 10 may have an interior volume 24. In certain embodiments, a stabilization mandrel 30 may be included in the interior volume 24 before the hydraulic or gas radial compressive forming process, as shown in FIG. 6. The stabilization mandrel is sized to allow the wall thickness to yield without buckling during the radial compression forming process.

As shown in FIG. 7, the straightened metallic hollow tubular product 10 at elevated or ambient temperatures may be subjected to a mechanical radial compression forming process by use of a drawing die 40 sized for tubes at elevated or ambient temperatures. The drawing die 40 is configured to radially compress the straightened tube 10 to form a radial compression zone along a given axial length of the tube. As previously described herein, the radial compression zone allows the residual stress profile of the tube to be altered to provide a substantially reduced compressive residual hoop stress in wall fibers adjacent to the inner surface and a substantially reduced tensile residual stress in wall fibers adjacent to the outer surface after exiting the radial compression zone. In certain embodiments, the residual stress profile of the tube may be altered to provide a tensile residual hoop stress in wall fibers adjacent to the inner surface and/or a compressive residual hoop stress in wall fibers adjacent to the outer surface. In accordance with certain embodiments, the drawing die provides a compressive force circumferentially applied 360 degrees around the outer surface of the tube at a given axial location of the tube, as shown in FIG. 7. This allows the entire circumference and thickness of the tube to experience opposing compressive forces. In certain embodiments, after the straightened tube 10 exits the radial compression zone formed by the drawing die, the radially compressed tube 10' will exhibit reduced inner and outer diameters.

As shown in FIG. 8, the straightened metallic hollow tubular product 10 may be subjected to a mechanical radial compression forming process by use of set length forming dies. In the embodiment shown, the forming dies include semi-circular first and second forming dies 50 and 52. However, any other suitable number and shape of forming dies may be used, e.g., the forming die may be one, three, four or more forming dies around the circumference. The forming dies are configured to radially compress sequentially each axial section of the straightened tube 10 to form a radial compression zone along a given axial length of the tube. In accordance with certain embodiments, the forming die provides a compressive force circumferentially applied 360 degrees around the outer surface of the tube at a given axial location of the tube, as shown in FIG. 8. This allows the entire circumference and thickness of the tube to experience opposing compressive forces. As previously described herein, the radial compression zone allows the residual stress profile of the tube to be altered to provide a substantially reduced compressive residual hoop stress in wall fibers adjacent to the inner surface and a substantially reduced tensile residual stress in wall fibers adjacent to the outer surface after exiting the radial compression zone. In certain embodiments, the residual stress profile of the tube may be altered to provide a tensile residual hoop stress in wall fibers adjacent to the inner surface and/or a compressive residual hoop stress in wall fibers adjacent to the outer surface. In certain embodiments, the first and second forming dies 50 and 52 have an axial length that is less than the axial length of the straightened tube 10, such that the forming dies 50 and 52 may be moved along the axial length of the tube to sequentially provide a radial compression zone along the entire axial length of the tube to form the radially compressed tube 10'. In certain embodiments, after the straightened tube 10 exits the radial compression zone formed by the forming die, the radially compressed tube 10' will exhibit reduced inner and outer diameters.

As shown in FIG. 9-11, the straightened metallic hollow tubular product 10 may be subjected to a mechanical radial compression forming process by use of opposing compression rollers. As shown in FIG. 9, the compression process may include a single set of opposing compression rollers 60 and 62. In the embodiment shown in FIG. 9, the opposing compression rollers are located above and below the straightened metallic hollow tubular product 10. The compression rollers are configured to radially compress the straightened tube 10 to form a radial compression zone along a given axial length of the tube. In accordance with certain embodiments, each compression roller applies a compressive force circumferentially to at least 90 degrees around the outer surface of the tube at a given axial location, as shown in FIG. 9. This allows at least both halves of the circumference of the tube to experience opposing compressive forces. As previously described herein, the radial compression zone allows the residual stress profile of the tube to be altered to provide a substantially reduced compressive residual hoop stress in wall fibers adjacent to the inner surface and a substantially reduced tensile residual stress in wall fibers adjacent to the outer surface after exiting the radial compression zone. In certain embodiments, the residual stress profile of the tube may be altered to provide a tensile residual hoop stress in wall fibers adjacent to the inner surface and/or a compressive residual hoop stress in wall fibers adjacent to the outer surface. In certain embodiments, after the straightened tube 10 exits the radial compression zone formed by the compression rollers, the radially compressed tube 10' will exhibit reduced inner and outer diameters.

As shown in FIG. 10, the compression process may include a single set of three opposing compression rollers 70, 72 and 74. In the embodiment shown in FIG. 9, the three opposing compression rollers are located around the circumference of the straightened metallic hollow tubular product 10. For example, the compression rollers may be located around the circumference of the straightened metallic hollow tubular product 10 in 120 degree segments. The compression rollers are configured to radially compress the straightened tube 10 to form a radial compression zone along a given axial length of the tube. In accordance with certain embodiments, each compression roller applies a compressive force circumferentially to at least 60 degrees around the outer surface of the tube at a given axial location, as shown in FIG. 10. This allows each of the three segments of the circumference of the tube to experience opposing compressive forces. In accordance with an embodiment of the present invention, although the compression rollers are not directly opposite to each other, the compressive force applied by the roller is opposed by the compressive force applied the other two rollers. In accordance with an embodiment of the present invention, a plurality of opposing compression rollers sets may be used, e.g., two, three, four, five or more adjacent sets along the axial length of the tube. As previously described herein, the radial compression zone allows the residual stress profile of the tube to be altered to provide a substantially reduced compressive residual hoop stress in wall fibers adjacent to the inner surface and a substantially reduced tensile residual stress in wall fibers adjacent to the outer surface after exiting the radial compression zone. In certain embodiments, the residual stress profile of the tube may be altered to provide a tensile residual hoop stress in wall fibers adjacent to the inner surface and/or a compressive residual hoop stress in wall fibers adjacent to the outer surface. In certain embodiments, after the straightened tube 10 exits the radial compression zone formed by the compression rollers, the radially compressed tube 10' will exhibit reduced inner and outer diameters As shown in FIG. 11, the compression process may include three set of opposing compression rollers 80 and 82, 90 and 92, and 100 and 102. However, any other suitable number of sets of opposing compression rollers may be used, for example, two, four, five, six or more adjacent sets along the axial length of the tube. In the embodiment shown in FIG. 10, two sets of opposing compression rollers are located above and below the straightened metallic hollow tubular product 10 and one set of opposing compression rollers is located left and right of the straightened metallic hollow tubular product 10. However, any other suitable arrangement of compression rollers may be used. In accordance with an embodiment of the present invention, a plurality of sets of opposing compression rollers allows for less radial force to be applied to any single set of two rollers so that the total work of the radial compression is divided between the total number of sets. The compression rollers are configured to radially compress the straightened tube 10 to form a radial compression zone along a given axial length of the tube. In accordance with certain embodiments, each compression roller applies a compressive force circumferentially to at least 90 degrees around the outer surface of the tube at a given axial location, as shown in FIG. 11. This allows both halves of the circumference of the tube to experience opposing compressive forces. As previously described herein, the radial compression zone allows the residual stress profile of the tube to be altered to provide a substantially reduced compressive residual hoop stress in wall fibers adjacent to the inner surface and a substantially reduced tensile residual stress in wall fibers adjacent to the outer surface after exiting the radial compression zone. In certain embodiments, the residual stress profile of the tube may be altered to provide a tensile residual hoop stress in wall fibers adjacent to the inner surface and/or a compressive residual hoop stress in wall fibers adjacent to the outer surface. In certain embodiments, after the straightened tube 10 exits the radial compression zone formed by the compression rollers, the radially compressed tube 10' will exhibit reduced inner and outer diameters.

The following examples are intended to illustrate various aspects of the present invention, and are not intended to limit the scope of the invention.

Example 1

Figure 12:
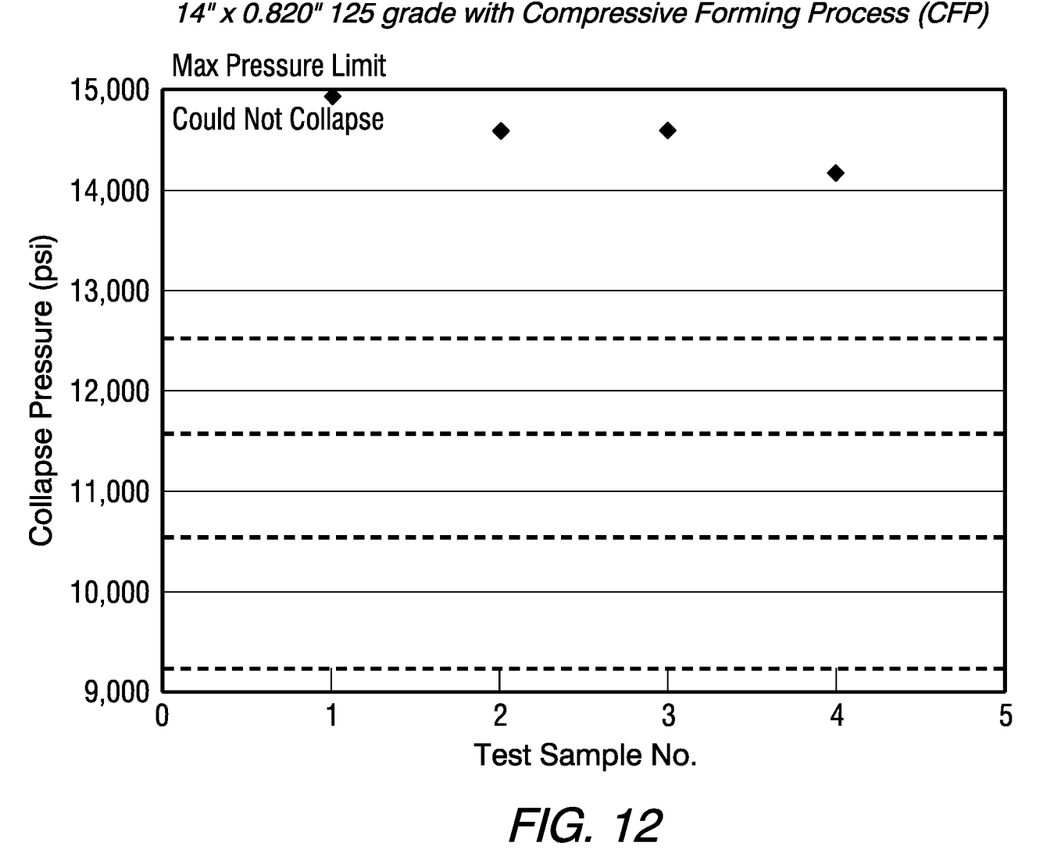
FIGS. 12-15 are graphs showing collapse pressure for various metallic tubular products including those subjected to compressive forming processes in accordance with embodiments of the present invention.

Rotary straightened 14"×0.820" sample 125 grade steel tubes were subjected to a radial compression process in accordance with an embodiment of the present invention. The collapse pressures of the resultant products are shown in FIG. 12. As shown in FIG. 12, the bottom dashed line represents the minimum collapse pressure of 9,230 psi for API Q125 grade tubes available today, the next dashed line represents the minimum collapse pressure of 10,530 psi for 125 High Collapse grade tubes available three years ago, the next dashed line represents the minimum collapse pressure of 11,580 psi for 125 High Collapse grade tubes available today, and the top dashed line represents the minimum collapse pressure of 12,540 psi for 125 High Collapse grade tubes subjected a radial compression process in accordance with an embodiment of the present invention. Thus, the top dashed line in FIG. 12 corresponds to a target collapse pressure achieved with a radial compressive forming process in accordance with an embodiment of the present invention. As can be seen, all test sample collapse pressure results were significantly higher than the collapse pressures achievable by conventional methods, and are above the target collapse pressure achieved with a radial compressive forming process in accordance with an embodiment of the present invention.

Example 2

Figure 13:
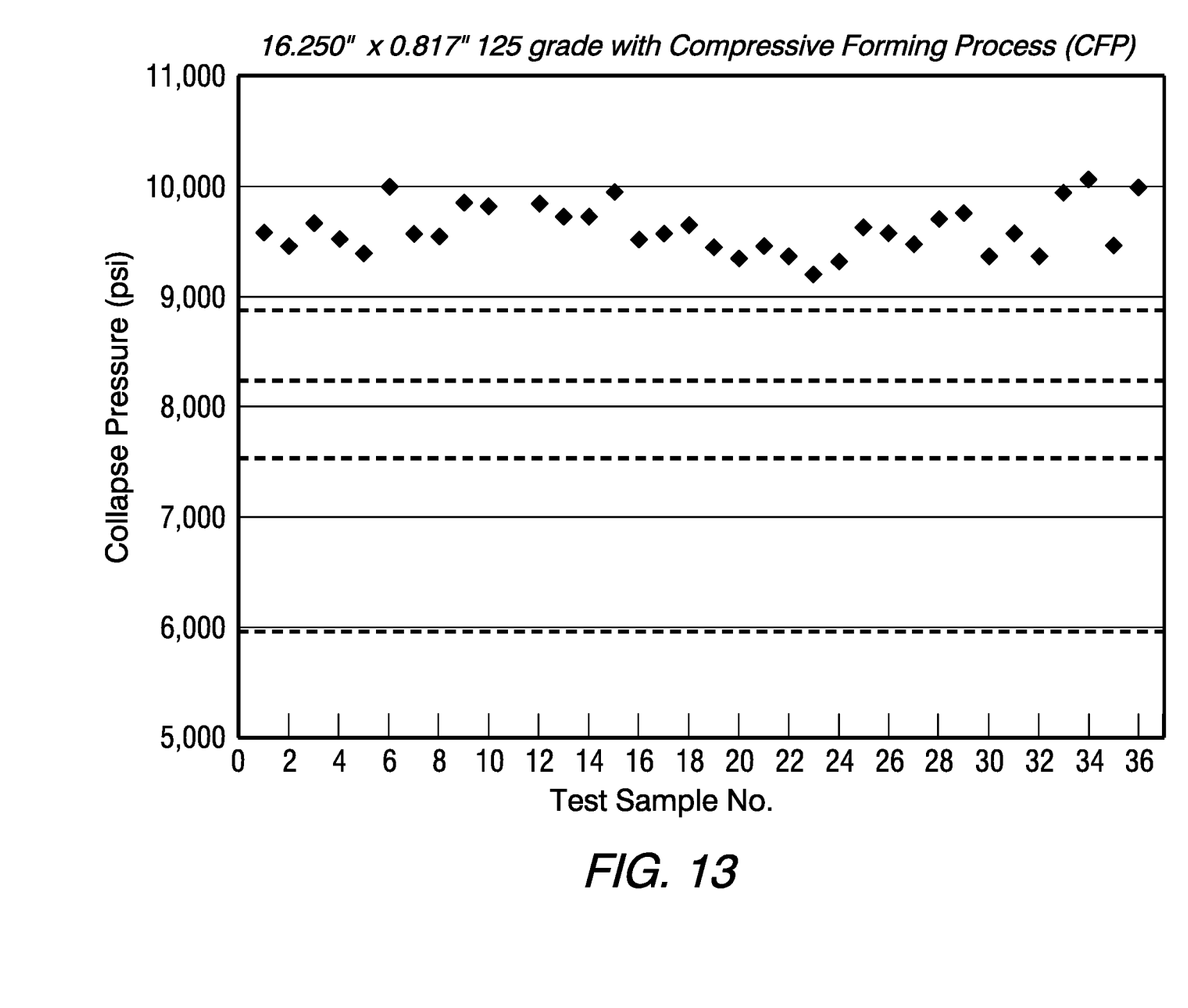

Rotary straightened 16.25"×0.817" sample 125 grade steel tubes were subjected to a radial compression process in accordance with an embodiment of the present invention. The collapse pressures of the resultant products are shown in FIG. 13. As shown in FIG. 13, the bottom dashed line represents the minimum collapse pressure of 5,960 psi for API Q125 grade tubes available today, the next dashed line represents the minimum collapse pressure of 7,510 psi for 125 High Collapse grade tubes available three years ago, the next dashed line represents the minimum collapse pressure of 8,210 psi for 125 High Collapse grade tubes available today, and the top dashed line represents the minimum collapse pressure of 8,860 psi for 125 High Collapse grade tubes subjected a radial compression process in accordance with an embodiment of the present invention. Thus, the top dashed line in FIG. 13 corresponds to a target collapse pressure achieved with a radial compressive forming process in accordance with an embodiment of the present invention. As can be seen, all test sample collapse pressure results were significantly higher than the collapse pressures achievable by conventional methods, and are above the target collapse pressure achieved with a radial compressive forming process in accordance with an embodiment of the present invention.

Example 3

Figure 14:
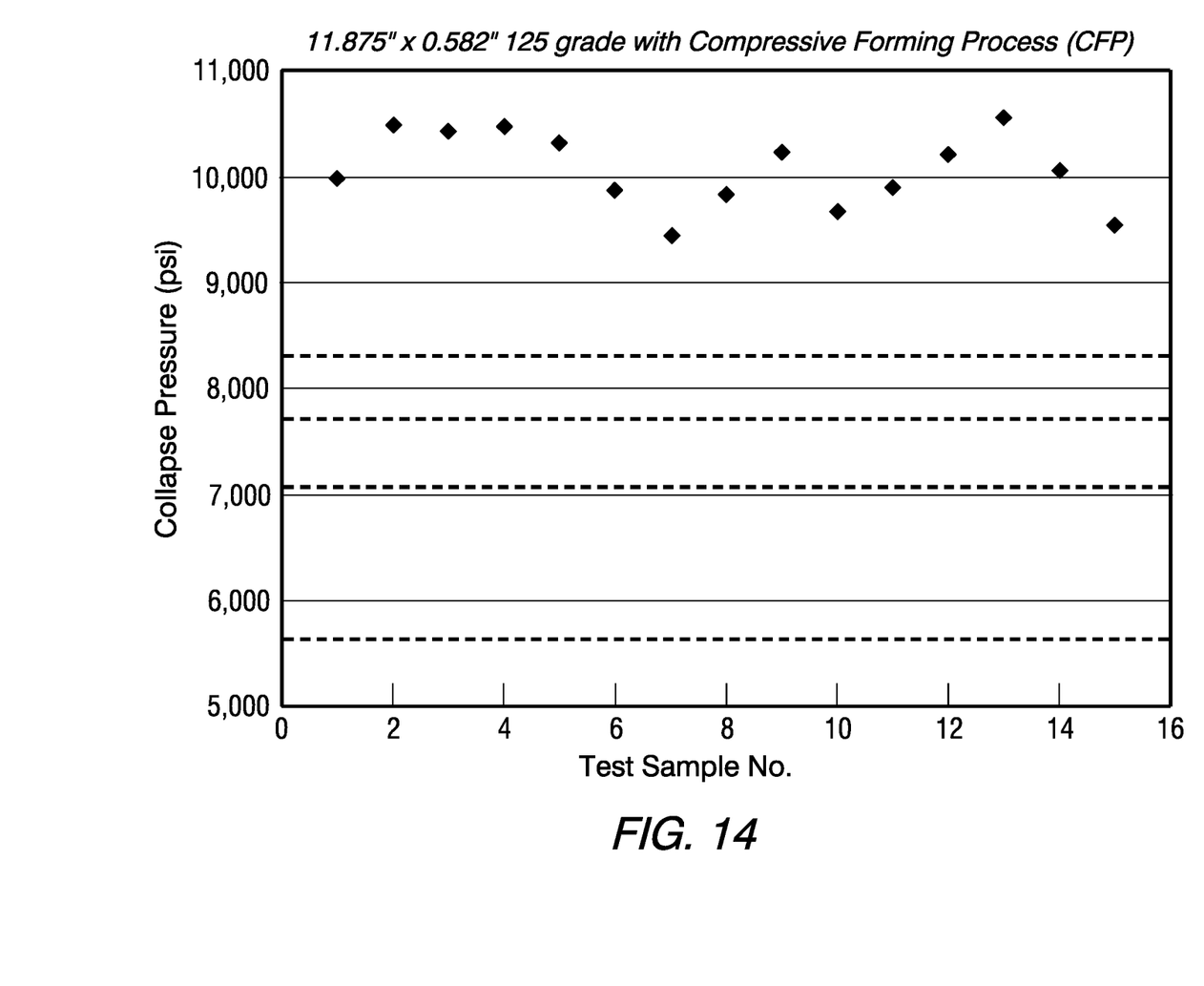

Rotary straightened 11.875"×0.582" sample steel tubes were subjected to a radial compression process in accordance with an embodiment of the present invention. The collapse pressures of the resultant products are shown in FIG. 14. As shown in FIG. 14, the bottom dashed line represents the minimum collapse pressure of 5,630 psi for API Q125 grade tubes available today, the next dashed line represents the minimum collapse pressure of 7,070 psi for 125 High Collapse grade tubes available three years ago, the next dashed line represents the minimum collapse pressure of 8,720 psi for 125 High Collapse grade tubes available today, and the top dashed line represents the minimum collapse pressure of 8,310 psi for 125 High Collapse grade tubes subjected a radial compression process in accordance with an embodiment of the present invention. Thus, the top dashed line in FIG. 14 corresponds to a target collapse pressure achieved with a radial compressive forming process in accordance with an embodiment of the present invention. As can be seen, all test sample collapse pressure results were significantly higher than the collapse pressures achievable by conventional methods, and are above the target collapse pressure achieved with a radial compressive forming process in accordance with an embodiment of the present invention.

Example 4

Figure 15:
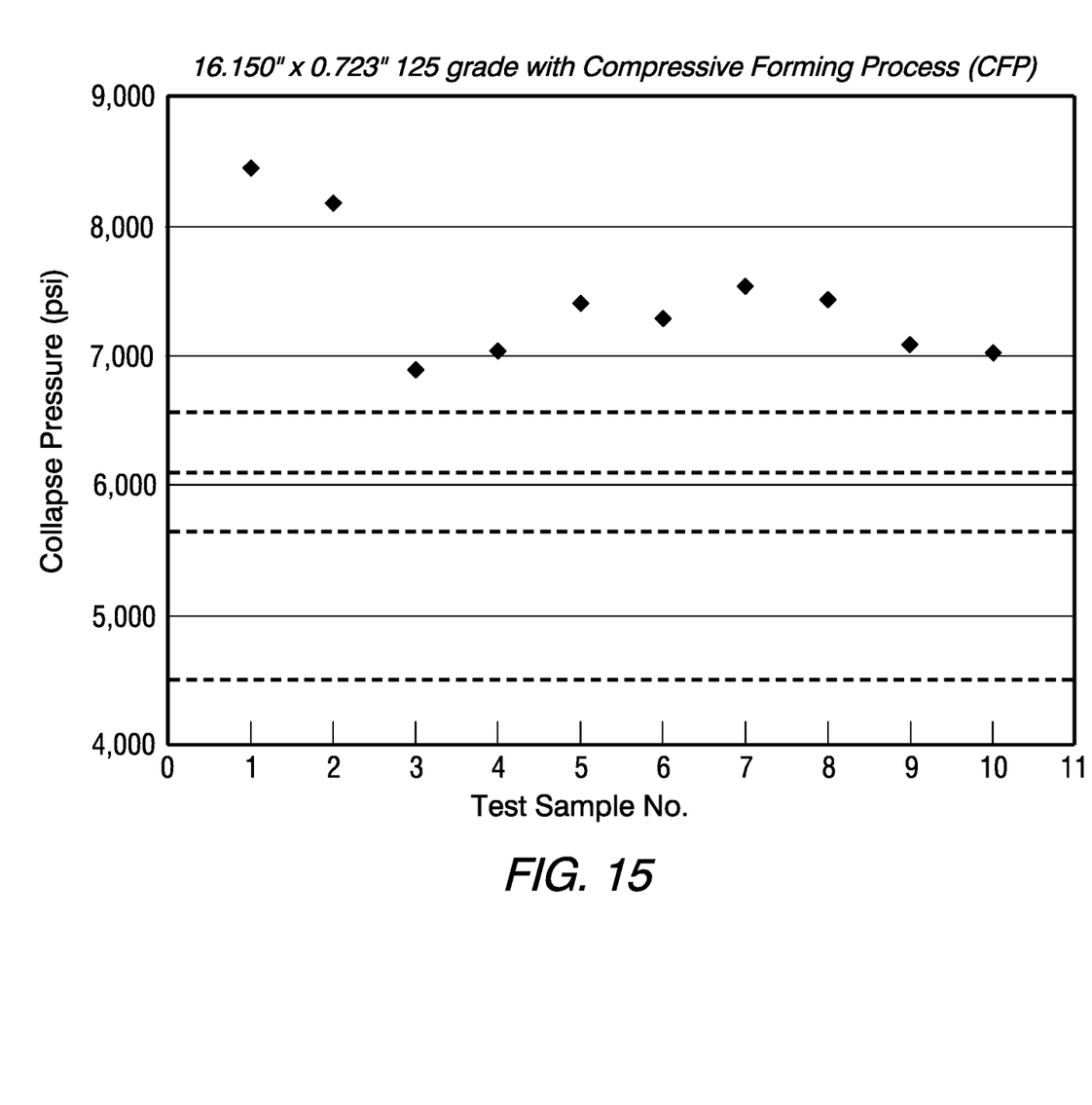

Rotary straightened 16.15"×0.723" sample steel tubes were subjected to a radial compression process in accordance with an embodiment of the present invention. The collapse pressures of the resultant products are shown in FIG. 15. As shown in FIG. 15, the bottom dashed line represents the minimum collapse pressure of 4,510 psi for API Q125 grade tubes available today, the next dashed line represents the minimum collapse pressure of 5,650 psi for 125 High Collapse grade tubes available three years ago, the next dashed line represents the minimum collapse pressure of 6,120 psi for 125 High Collapse grade tubes available today, and the top dashed line represents the minimum collapse pressure of 6,560 psi for 125 High Collapse grade tubes subjected a radial compression process in accordance with an embodiment of the present invention. Thus, the top dashed line in FIG. 15 corresponds to a target collapse pressure achieved with a radial compressive forming process in accordance with an embodiment of the present invention. As can be seen, all test sample collapse pressure results were significantly higher than the collapse pressures achievable by conventional methods, and are above the target collapse pressure achieved with a radial compressive forming process in accordance with an embodiment of the present invention.

For purposes of the description above, it is to be understood that the invention may assume various alternative variations and step sequences except where expressly specified to the contrary. Moreover, other than in any operating examples, or where otherwise indicated, all numbers expressing, for example, quantities of ingredients used in the specification and claims, are to be understood as being modified in all instances by the term "about". Accordingly, unless indicated to the contrary, the numerical parameters set forth are approximations that may vary depending upon the desired properties to be obtained by the present invention. At the very least, and not as an attempt to limit the application of the doctrine of equivalents, each numerical parameter should at least be construed in light of the number of reported significant digits and by applying ordinary rounding techniques.

It should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention as defined in the appended claims.

What is claimed is:

1. A radially compressed metallic hollow tubular product comprising an outer diameter and an inner diameter, wherein the radially compressed metallic hollow tubular product has a compressive residual hoop stress adjacent to an inner surface thereof, and a tensile residual hoop stress adjacent to an outer surface thereof, and wherein the radially compressed metallic hollow tubular product has a collapse resistance that is at least 2 percent greater than a collapse resistance of the metallic hollow tubular product prior to radial compression, and has:
(a) a substantially reduced compressive residual hoop stress adjacent to an inner surface thereof, or
(b) a tensile residual hoop stress adjacent to the inner surface thereof,
the radially compressed metallic hollow tubular product has:
(a) a substantially reduced tensile residual hoop stress adjacent to an outer surface thereof; or
(b) a compressive residual hoop stress adjacent to the outer surface thereof; and
wherein the radially compressed metallic hollow tubular product has a residual hoop stress adjacent to the inner surface of from −10 to +30 percent of a yield strength of the radially compressed metallic hollow tubular product.

2. The radially compressed metallic hollow tubular product of claim 1, wherein the outer diameter of the radially compressed metallic hollow tubular product is at least 0.002 percent smaller than an outer diameter of the metallic hollow tubular product prior to radial compression, and the inner diameter of the radially compressed metallic hollow tubular product is at least 0.002 percent smaller than the inner diameter of the metallic hollow tubular product prior to radial compression.

3. The radially compressed metallic hollow tubular product of claim 2, wherein the outer diameter of the radially compressed metallic hollow tubular product is from 0.002 percent to 0.2 percent smaller than the outer diameter of the metallic hollow tubular product prior to radial compression, and the inner diameter of the radially compressed metallic hollow tubular product is from 0.002 percent to 0.2 percent smaller than the inner diameter of the metallic hollow tubular product prior to radial compression.

4. The radially compressed metallic hollow tubular product of claim 1, wherein the metallic hollow tubular product prior to radial compression has a wall thickness $T_W$ and the radially compressed metallic hollow tubular product has a wall thickness $T'_W$, and the wall thickness $T'_W$ of the radially compressed metallic hollow tubular product is thicker than the wall thickness $T_W$ of the metallic hollow tubular product prior to radial compression.

5. The radially compressed metallic hollow tubular product of claim 1, wherein the metallic hollow tubular product prior to radial compression has a D/t ratio of greater than or equal to 10:1 and less than or equal to 40:1.

6. The radially compressed metallic hollow tubular product of claim 1, wherein the radially compressed metallic hollow tubular product has a tensile residual hoop stress adjacent to the inner surface thereof.

7. A radially compressed metallic hollow tubular product comprising an outer diameter and an inner diameter, wherein the radially compressed metallic hollow tubular product has a compressive residual hoop stress adjacent to an inner surface thereof, and a tensile residual hoop stress adjacent to an outer surface thereof, and wherein the radially compressed metallic hollow tubular product has a residual hoop stress adjacent to the inner surface of from −10 to +30 percent of a yield strength of the radially compressed metallic hollow tubular product, and has:
(a) a substantially reduced compressive residual hoop stress adjacent to an inner surface thereof, or
(b) a tensile residual hoop stress adjacent to the inner surface thereof, and
the radially compressed metallic hollow tubular product has:
(a) a substantially reduced tensile residual hoop stress adjacent to an outer surface thereof; or
(b) a compressive residual hoop stress adjacent to the outer surface thereof.

8. The radially compressed metallic hollow tubular product of claim 7, wherein the outer diameter of the radially compressed metallic hollow tubular product is at least 0.002 percent smaller than an outer diameter of the metallic hollow tubular product prior to radial compression, and the inner diameter of the radially compressed metallic hollow tubular product is at least 0.002 percent smaller than an inner diameter of the metallic hollow tubular product prior to radial compression.

9. The radially compressed metallic hollow tubular product of claim 8, wherein the outer diameter of the radially compressed metallic hollow tubular product is from 0.002 percent to 0.2 percent smaller than the outer diameter of the metallic hollow tubular product prior to radial compression, and the inner diameter of the radially compressed metallic hollow tubular product is from 0.002 percent to 0.2 percent smaller than the inner diameter of the metallic hollow tubular product prior to radial compression.

10. The radially compressed metallic hollow tubular product of claim 7, wherein the metallic hollow tubular product prior to radial compression has a wall thickness $T_W$ and the radially compressed metallic hollow tubular product has a wall thickness $T'_W$, and the wall thickness $T'_W$ of the radially compressed metallic hollow tubular product is thicker than the wall thickness $T_W$ of the metallic hollow tubular product prior to radial compression.

11. The radially compressed metallic hollow tubular product of claim 7, wherein the metallic hollow tubular product prior to radial compression has a D/t ratio of greater than or equal to 10:1 and less than or equal to 40:1.

12. The radially compressed metallic hollow tubular product of claim 7, wherein the radially compressed metallic hollow tubular product has a residual hoop stress adjacent to the inner surface of from −10 to +30 percent of a yield strength of the radially compressed metallic hollow tubular product.

13. The radially compressed metallic hollow tubular product of claim 7, wherein the radially compressed metallic hollow tubular product has a substantially reduced compressive residual hoop stress adjacent to the inner surface thereof.

14. The radially compressed metallic hollow tubular product of claim 7, wherein the radially compressed metallic hollow tubular product has a tensile residual hoop stress adjacent to the inner surface thereof.

* * * * *